United States Patent [19]

Sweeney

[11] 4,390,417

[45] Jun. 28, 1983

[54] METHOD FOR DEWATERING NON-AQUEOUS LIQUIDS

[75] Inventor: William M. Sweeney, Wappingers Falls, N.Y.

[73] Assignee: Texaco Inc., White Plains, N.Y.

[21] Appl. No.: 285,197

[22] Filed: Jul. 20, 1981

[51] Int. Cl.³ ............................................. B01D 33/04
[52] U.S. Cl. ................................... 208/188; 210/739; 210/749
[58] Field of Search ............... 208/187, 188; 210/739, 210/749; 137/13

[56] References Cited

U.S. PATENT DOCUMENTS 3,367,850  2/1968  Johnson .............................. 208/187
3,438,892  4/1969  Wymore et al. ..................... 208/188
4,211,639  7/1980  Jackson .............................. 208/188

*Primary Examiner*—Delbert E. Gantz
*Assistant Examiner*—Anthony R. McFarlane
*Attorney, Agent, or Firm*—Carl G. Ries; Robert A. Kulason; Carl G. Seutter

[57] ABSTRACT

Apparatus for dewatering flowing diesel fuel includes an agglomerator in a conduit, a sump containing an acid resin catalyst, a sensor in the sump for detecting water, and a conduit for injecting dimethoxyketal into the sump, in accordance with a signal generated by the sensor, the dimethoxy ketal reacting with the water in the diesel fuel in the presence of the catalyst whereby the flowing diesel fuel is dewatered.

10 Claims, 4 Drawing Figures

METHOD FOR DEWATERING NON-AQUEOUS LIQUIDS

FIELD OF THE INVENTION

This invention relates to a novel apparatus for dewatering a flowing stream of non-aqueous liquid which contains water.

BACKGROUND OF THE INVENTION

As is well known to those skilled in the art, many non-aqueous liquids are handled and utilized; and it is desired to maintain these liquids in dry form free of suspended or entrained water. In the case of hydrocarbons, typified by diesel fuels for example, if water is present in amount greater than about 0.05 w %, it is found that there is undesirably high corrosion of various parts of the diesel engine including fuel pump injectors. This may be a serious problem if, after use of such a fuel, the engine is shut down for an extended period of time.

It is an object of this invention to provide an apparatus for dewatering a flowing stream of non-aqueous liquid. Other objects will be apparent to those skilled in the art.

STATEMENT OF THE INVENTION

In accordance with certain of its aspects, this invention is directed to an apparatus for dewatering a flowing stream of non-aqueous liquid containing water therein which comprises a conduit through which said flowing stream passes, a body of acid resin catalyst in said conduit, an inlet passage for injecting dewatering chemical into said flowing stream prior to the contact of said flowing stream with said acid resin catalyst, a water-sensing probe in said flowing stream prior to the point at which said inlet passage is positioned, a sensor associated with said probe whereby, as said water-sensing probe detects water in the flowing stream, a signal is generated by said sensor in accordance with the water content detected by said water-sensing probe, and means for controlling the passage of said dewatering chemical to said inlet passage in accordance with said signal.

DESCRIPTION OF THE INVENTION

The non-aqueous liquids which may be dewatered by the apparatus of this invention may include a wide variety of liquids which are found in commerce. The most common of these liquids with which this apparatus is intended to be used are hydrocarbon fuels. Typical of the heavy (heavier than gasoline) fuels may be fuel oil or more preferably diesel fuel.

Diesel fuel, whether identified as D-1 or as D-2, is commonly produced containing substantially no water i.e. less than about 0.01 w %. As it is handled, transported, and stored, it may pick up water in amount up to 5 w %. Depending on the temperature, other impurities present, and the degree of agitation, the water may be present as large droplets intimately suspended in the hydrocarbon, as larger droplets which may drop out in quiescent areas of the hydrocarbon, or as a discrete separate phase which may be readily discernable and separable.

In the case of diesel fuel, it is possible to feed the hydrocarbon to an engine and to obtain proper combustion even when the fuel contains a low water content. As the water content increases up into the range of 0.05 w %–0.2 w %, combustion may be obtained with high probability of at least intermittent problems. As water content increases above about 0.2 w %, the ability of an engine to run using diesel fuel is minimized. Accordingly it is generally accepted that the maximum water content of a diesel fuel be about 0.05 w %.

The apparatus and process of this invention, which may commonly be employed in a fuel feed line to a diesel engine may include a water-sensing probe in the flowing stream through which the wet hydrocarbon is passing. When the process is to function on an in-line basis, the water sensing probe may be a conductivity meter which determines the water content of the flowing hydrocarbon as a function of the conductivity. Various commercially available conductivity meters may be employed. Typical of these is the Digital Conductivity Meter made by EMCGE Electronics Inc. (of 177 Old Churchman Road, New Castle, Del.).

In another embodiment of this invention, the water-sensing probe may be a water-level meter adapted to determine the elevation of the surface of a body of water under a body of eg diesel fuel. Generally a conductivity meter may be preferred when the amount of water is small and the water does not normally separate into a discernable separate phase; and a water level meter may be preferred when the amount of water which may be expected to be present is such that an observable surface may be expected. Clearly however in this latter instance, a conductivity meter may be alternatively employed.

The water-sensing probe, whether of the conductivity-measuring or of the level-measuring type, has associated therewith a sensor wherein a signal is generated in accordance with the water detected by the probe. This signal, which may preferably be pneumatic or more preferably electrical, activates a means for admitting liquid dewatering chemical into the flowing stream of hydrocarbon, downstream of the point at which the water-sensing probe is positioned.

Although the means for admitting the liquid dewatering chemical may include a valve, as when for example it is desired to employ a gravity feed. it is more preferred especially in large scale operations that the means for admitting the liquid dewatering chemical include a pump—and this means is activated (the valve is opened or the pump is turned on) when the probe indicates the presence of water above a pre-set amount.

The liquid dewatering chemical is passed through an inlet conduit for injecting dewatering chemical into the flowing stream of eg hydrocarbon at a point downstream of the point at which the probe is positioned. Preferably the inlet conduit bears at least one nozzle thereon whereby the dewatering chemical is injected into the flowing stream in a downstream direction to thereby provide additional velocity head which may facilitate mixing of the chemical with the flowing hydrocarbon. The dewatering chemical is preferably admitted at a point between the probe and the entrance to the body of catalyst.

The dewatering chemical which may be employed in practice of this invention may be a ketal or acetal or orthoester. Although mixtures of these chemicals may be employed, it is preferred to use one chemical.

The ketal may be characterized by the formula $R_2C(OR')_2$; and the acetal may be characterized by the formula $RCH(OR')_2$; and the orthoester may be characterized by the formula $RC(OR')_3$.

In the above compound, R or R' may be a hydrocarbon radial selected from the group consisting of alkyl and cycloalkyl including such radicals when inertly substituted. When R is alkyl, it may typically be methyl, ethyl, n-propyl, iso-propyl, n-butyl, i-butyl, sec-butyl, amyl, octyl, decyl, octadecyl, etc. When R is cycloalkyl, it may typically be cyclohexyl, cycloheptyl, cyclobutyl, 2-methylcycloheptyl, 3-butylcyclohexyl, 3-methylcyclohexyl, etc. R may be inertly substituted i.e. it may bear a non-reactive substituent such as alkyl, cycloalkyl, ether, halogen, etc. Typically inertly substituted R groups may include 3-chloropropyl, 2-ethoxyethyl, carboethoxymethyl, 4-methylcyclohexyl, etc. The preferred R groups may be lower alkyl, i.e. $C_1$–$C_{10}$ alkyl, groups including eg methyl, ethyl, n-propyl, i-propyl, butyls, amyls, hexyls, octyls, decyls, etc. R may preferably be methyl. R' may preferably be methyl or ethyl.

In the preferred embodiment, R and R' may be lower alkyl i.e. $C_1$ to $C_{10}$ but may preferably be $C_1$ to $C_4$ alkyl. Illustrative ketals may include:

TABLE 2,2-dimethoxy propane
2,2-dimethoxy pentane
2,2-dimethoxy butane
2,2-dimethoxy pentane
2,2-diethoxy propane
2,2-di(cyclohexoxy) propane, etc.

Illustrative acetals may include:

TABLE di-methoxy methane
1,1-di-methoxy propane
1,1-diethoxy propane
1,1-dipropoxy propane
1,1-dimethoxy-n-butane
1,1-diethoxy-n-butane Illustrative orthoesters may include:

TABLE ethyl orthoformate
methyl orthobutyrate
n-propyl orthoacetate

The preferred of these compounds may be dimethoxy ketal, preferably 2,2-dimethoxy propane.

The ketal or acetal or orthoesters may be added to the system in amount at least equivalent to the water present i.e. in amount of at least one mole of ketal or acetal or orthoester per mole of water present. The mole ratio of ketal or acetal or orthoesters to water may be 1–20:1, preferably 1.05–1.5:1, say 1.1:1. It will be apparent to those skilled in the art that amounts less than that corresponding to a mole ratio of 1:1 may be employed if it be not necessary to remove all the water.

The mixture of dewatering chemical and non-aqueous liquid is passed into contact with a solid acid resin catalyst which maintains the pH of the system below 7 and commonly 1–6.5. Preferred range may be above about 5 and below 7.

It is possible to employ solid acids including resins such as reticular divinyl benzene-crosslinked sulfonated styrene copolymer cation exchange resins typified by the Rohm and Haas Amberlyst 15 resin having a hydrogen ion concentration of 4.9 meq per gram of dry resin and a surface area of 42.5 square meters per gram.

The preferred acid is maintained in the apparatus as a body. It may be suspended in forminous bags or baskets of acid pellets in contact with the composition.

It appears that the ketal or acetal or orthoester reacts at pH below 7 with the water thereby forming alcohols. Water is thus removed from the system and alcohol substituted therefor. Typically the preferred 2,2-dimethoxy propane reacts with water to form methanol and acetone.

The non-aqueous liquid leaving the body of acid resin catalyst may be particularly characterized by decreased water content. It may be desirable to merely lower the water content to within the preferred range of 0.01 w %–0.05 w % or alternatively it may be desirable to decrease it down to the lowest measurable content of 0.01 w %.

It is a feature of this invention that it is possible to add an excess of dewatering chemical so that the liquid is "buffered" i.e. so that if the liquid is later contacted with additional water at pH below 7, the dewatering chemical will react therewith.

Under conditions in which it is not desirable to have the pressure drop which in-line operation incurs or when the amount or condition of water present is such that in-line operation is not preferred, it is possible to utilize a sump through which at least a portion of the flowing liquid is passed. In this embodiment, it is preferred that the liquid flowing through the conduit pass through an expanded or enlarged portion of the conduit so that the velocity of flow be decreased; this will assist in settling of suspended water.

Preferably the flowing liquid will pass through an agglomerator preferably adjacent to the entrance of the expanded portion of the conduit. The agglomerator preferably includes a body of high surface areas such as screening, steel wool, particles, metal shavings, beads, etc. on which water may deposit and form large agglomerates which may be carried along with the flowing liquid.

In this embodiment, agglomerated particles of water in the flowing stream of non-aqueous liquid are directed into a sump laterally positioned with respect to the conduit through which the non-aqueous liquid flows, and having an opening connecting it therewith. In one embodiment, the sump may have a body of acid resin catalyst suspended thereacross and the agglomerated water may pass downwardly therethrough. The water-sensing probe may be above or at an intermediate level, or preferably below the body of catalyst, as is also the inlet conduit for admitting liquid dewatering chemical.

As the probe, whether of the conductivity type or of the liquid level type, detects the presence of water in predetermined amount, the liquid dewatering chemical is admitted into the sump below the body of catalyst. Preferably the dewatering chemical is jetted in so that as it mixes with the water, the mixture is propelled upwardly through the catalyst bed wherein the dewatering reaction occurs. The velocity head plus the density head provide a flow of the dewatered stream back into the conduit.

In an embodiment which is more preferred because it provides a more positive flow in the sump, the sump is provided with an upstanding baffle which is transverse to the flow of liquid through said conduit and which divides the sump into an inlet channel and an outlet channel, the former being adjacent to the upstream portion of the conduit through which the stream is flowing and the latter being adjacent to the downstream portion of the conduit. Preferably there is a lip on the baffle projecting from the sump laterally into the conduit whereby at least a portion of the flowing stream is deflected into the inlet channel of the sump and thence into the outlet channel of the sump and back into the conduit.

In this embodiment the body of acid catalyst is preferably positioned in and across the outlet channel. The inlet conduit for injecting dewatering chemical into the water-containing flowing stream is preferably mounted in the outlet channel below the body of acid catalyst. The water-sensing probe positioned in the inlet channel may be of the conductivity-type or of the level-determining type. It may be positioned at a level above the bottom of the catalyst bed.

Regardless of which of the several embodiments be employed, it is found that it is readily possible to decrease the content of water in the non-aqueous liquid to desirable levels.

DESCRIPTION OF THE BEST MODE

Practice of the process of this invention will be apparent to those skilled in the art from the following descriptions of the best mode contemplated, as presently known to me. It will be apparent that the drawings to which reference is made, are schematic and do not show details of the equipment.

EXAMPLE I

Figure 1:
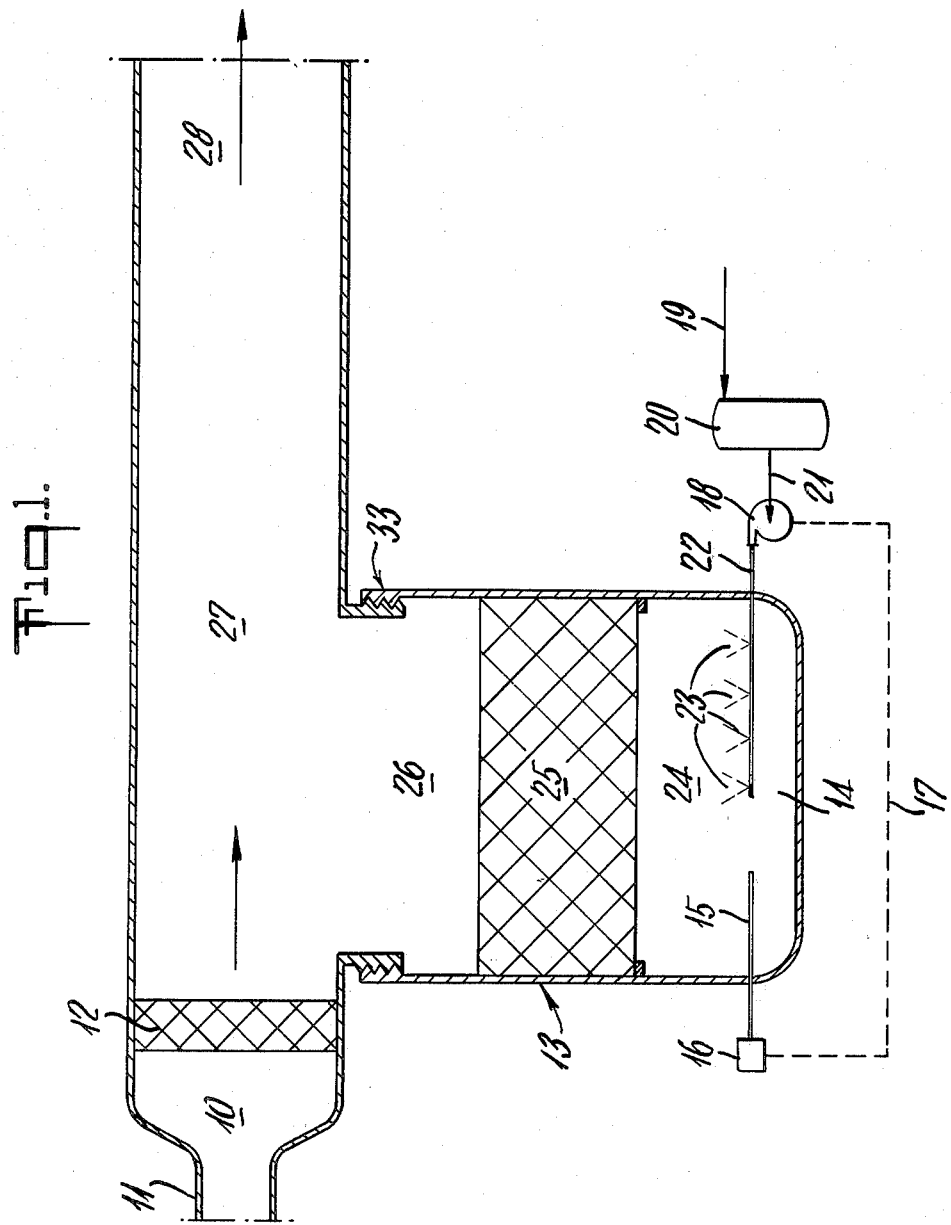
FIGS. 1 through 4 herein incorporated, describe the preferred embodiments of this invention.

In this example, the apparatus of FIG. 1 may be employed to decrease the content of water in a diesel fuel. The diesel fuel (D-1) as charged contains ca 1.0 w % water. As it passes through inlet expanded portion 10 of conduit 11, this water may be entrained as fine droplets or as larger agglomerates. If it be determined that the water is present in the form of fine droplets in suspension, the diesel fuel may be passed through an agglomerator 12 which may include a screen or a plurality of screens or a confined body of metal turnings which aid in agglomerating the water into larger droplets so that they may more readily drop out of the stream of diesel fuel.

The water, which is heavier than the main body of diesel fuel, drops into sump 13. It will be apparent to those skilled in the art that when the water is present in small quantities, the sump in operation may contain a mixture of diesel oil plus water or water containing entrained diesel oil therein.

In this embodiment, the water in the diesel fuel drops to the bottom portion 14 of the sump 13. When enough water has collected to contact the probe 15 of sensor 16 (or alternatively when the sensor is set to respond directly to the concentration of water in the fuel rather than to the water level in the sump), the sensor will generate a signal which is passed through line 17. This signal turns on pump 18 which pumps the ketal, 2,2-dimethoxy propane from line 19, storage vessel 20, and line 22 through nozzles 23 into the mixing area 24 of sump 13.

At this time, the 2,2-dimethoxy propane from nozzles 23 mixes with the liquid, containing water, in area 24. The mixture is generally forced upwardly because the nozzles are directed in direction to promote upward flow and mixing.

As the mixture in mixing area 24 is propelled upwardly, it passes through acid resin catalyst bed 25. This bed is preferably loaded with Amberlyst 15 brand of hydrogen form of divinylbenzene-crosslinked, sulfonated polystyrene solid resin catalyst. In bed 25, the dimethoxy ketal reacts with the water to produce product methanol and acetone both of which are more soluble in diesel fuel than is water; and thus there is formed a single phase mixture at area 26 which blends into the stream of flowing diesel fuel at area 27.

The dimethoxy ketal reactant and the product methanol and acetone are all lighter than the water reactant; and thus the mixture passing through bed 25 to areas 26 and 27 is less dense than is the water collected in area 14. This permits a density head to be developed which assists in forcing material upwardly through bed 25 and it assists the velocity head preferably generated by nozzles 23.

The diesel fuel at area 27 and also that exiting at area 28 is found to possess a lower water content than the fuel entering through area 10.

EXAMPLE II

Figure 2:
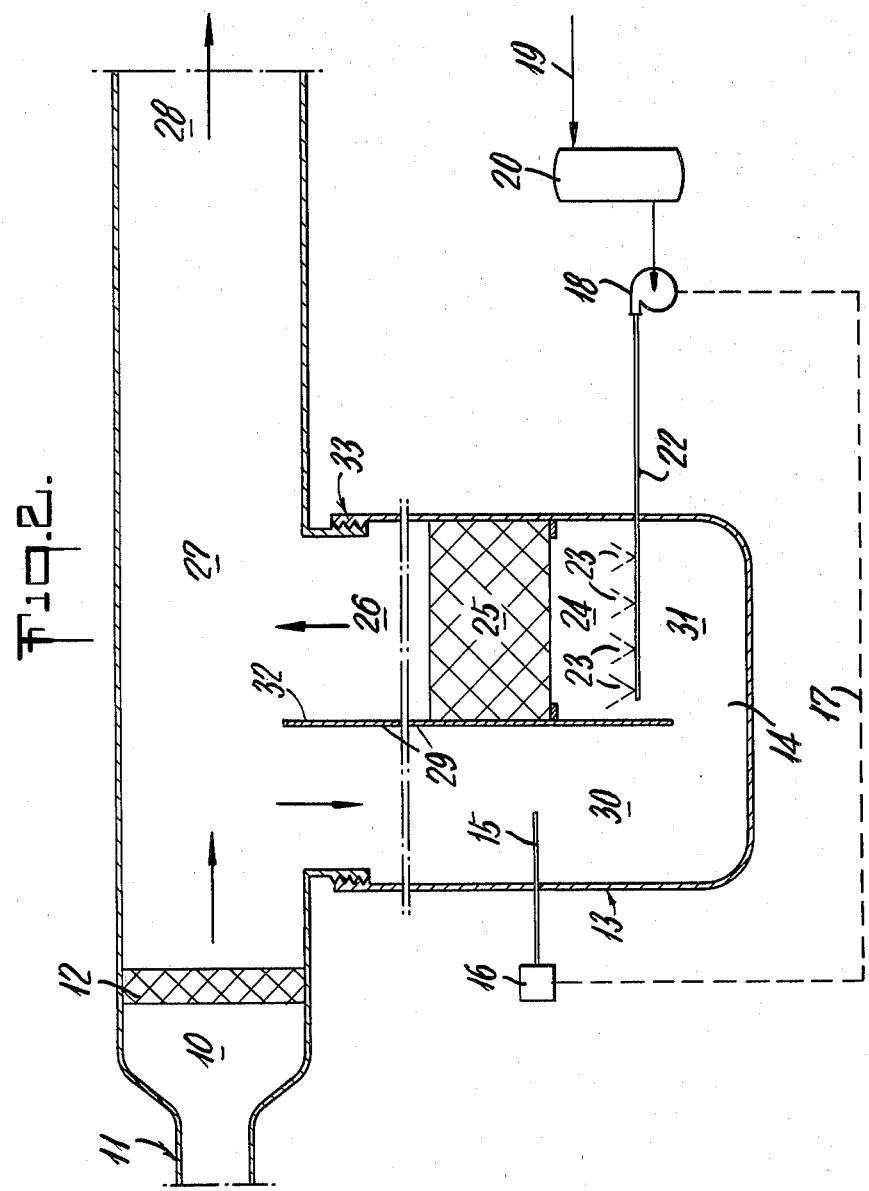

FIG. 2 shows a more preferred embodiment of the apparatus of this invention and in particular shows an embodiment which is the best mode presently known to me for carrying out the invention. In this FIG. 2, parts are numbered as in FIG. 1; and it will be observed that many of the parts are the same and are thus identically numbered.

In FIG. 2, the sump 13 includes an upstanding baffle 29 which is positioned more-or-less vertically in a central portion of sump 13 to form a portion 30 wherein fluid moves in a downwardly direction and a portion 31 wherein fluid moves in a generally upwardly direction. The baffle 29 may preferably include lip 32 which projects upwardly into conduit 11 by a distance which may be 10% of the diameter of the expanded portion of conduit 11.

In this embodiment, there is established a positive flow pattern downward through portion 30 and upwardly through portion 31 because of the velocity head primarily imparted through nozzles 23 and because of the density head arising out of the introduction of less-dense materials through nozzles 23 and the formation of additional less-dense materials in reaction zone or bed 25.

A portion of the fluid passes downwardly into sump 13 and contacts probe 15. This probe measures the conductivity of the fluid and detects the presence of water. A signal is generated in sensor 16 which is passed through line 17; and this signal activates pump 18 which passes dimethoxy ketal through line 22 to nozzles 23.

The mixed ketal and water is passed upwardly through acid resin catalyst bed 25 wherein the ketal reacts with the water to produce methanol and acetone. This passes upwardly through areas 26 and 27 to form in conduit 11 at area 28 a diesel fuel which has decreased content of water—typically 0.02 w % water.

If the diesel fuel entering through area 10 is found to be of decreased (or increased) water content, the probe 15 and sensor 16 will so indicate; and the amount of ketal admitted through nozzles 23 will be decreased (or increased).

EXAMPLE III

In this example, a specific illustrative embodiment is described utilizing the apparatus of FIG. 2. Conduit 11 is a 0.25 inch diameter pipe which opens out into enlarged portion 10 which is 1 inch in diameter. Sump 13 is a 6 inch diameter vessel, 6 inches long, secured by threads 33 to the lower portion of conduit 11. Agglomerator 12 is a one-inch thick body of steel filings (of about 1 mm thick and about 1 cm long) maintained between two screens.

Catalyst bed 25 contains 20 grams of Amberlyst 15 brand of catalyst.

Flowing through conduit 11 is 1 gallon per hour of D-1 diesel oil containing 0.1 w % water.

As the flowing oil passes through agglomerator 12, water suspended therein tends to agglomerate into large particles, and as this leaves the agglomerator 12, the heavier water (together with lighter oil) passes downwardly through inlet portion 30 past probe 15. In this embodiment, the probe 15 (and sensor 16) may be a Model W B 100G conductivity meter of the Scully Electronics Company (Wilmington, Mass.) which is sensitive to the presence of water. An electrical signal is generated at 16 which passes through line 17 to activate pump 18.

2,2-dimethoxy propane (0.01 gallons per hour) is passed from storage vessel 20 through line 21, pump 18 and line 22 to nozzles 23 from which it is projected into sump 13. Here the dimethoxy ketal, by its velocity head provided by nozzles 23 moves the mixture of dimethoxy ketal, water and any entrained oil upwardly through the body of acid resin catalyst 25. As the mix passes through the catalyst, the dimethoxy ketal reacts with the water to form acetone and methanol; and the mix passes upwardly into area 27 of the conduit.

The diesel fuel so treated is found to have a water content of less than 0.01 w %.

EXAMPLE IV

Figure 3:
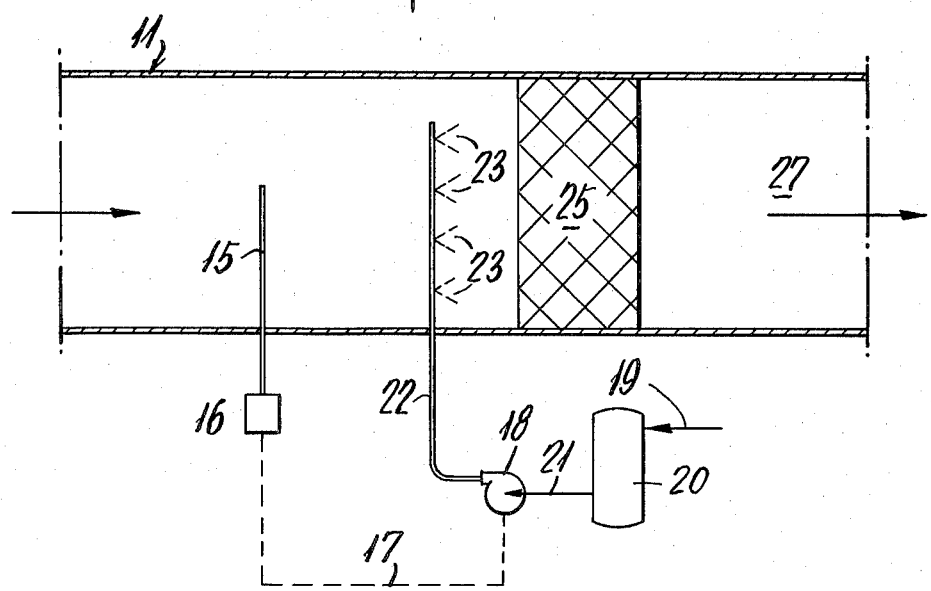

In this example, an embodiment is described (see FIG. 3) which may be particularly useful when the non-aqueous liquid contains a very small quantity of water—say less than about 0.05 w %.

In this embodiment, the non-aqueous liquid passes through conduit 11. As the flowing stream contacts probe 15, the presence of water therein illustrates a signal in sensor 16 which signal passes through line 17 to activate pump 18. 2,2-dimethoxy propane charged from line 19 to vessel 20 passes through line 21, pump 18, line 22, and nozzles 23 into the stream of liquid wherein it is mixed. As the mixture passes through acid resin catalyst bed 25, the 2,2-dimethoxy propane reacts with the water and the liquid is thus dried. The liquid of decreased water content is withdrawn through area 27.

EXAMPLE V

In another embodiment of this invention which may be preferred when the charge non-aqueous liquid contains very small amounts of water or when the water is intermittently present, the sump 13 shown in FIG. 2 may be built into the bottom of a fuel tank—preferably a diesel fuel tank and this may be considered the conduit through which the flowing stream passes. In one embodiment, the structure of the sump may be substantially identical to that in FIG. 3 except that the sump in FIG. 4 does not need a lip 32 as is the case of the sump in FIG. 2.

Figure 4:
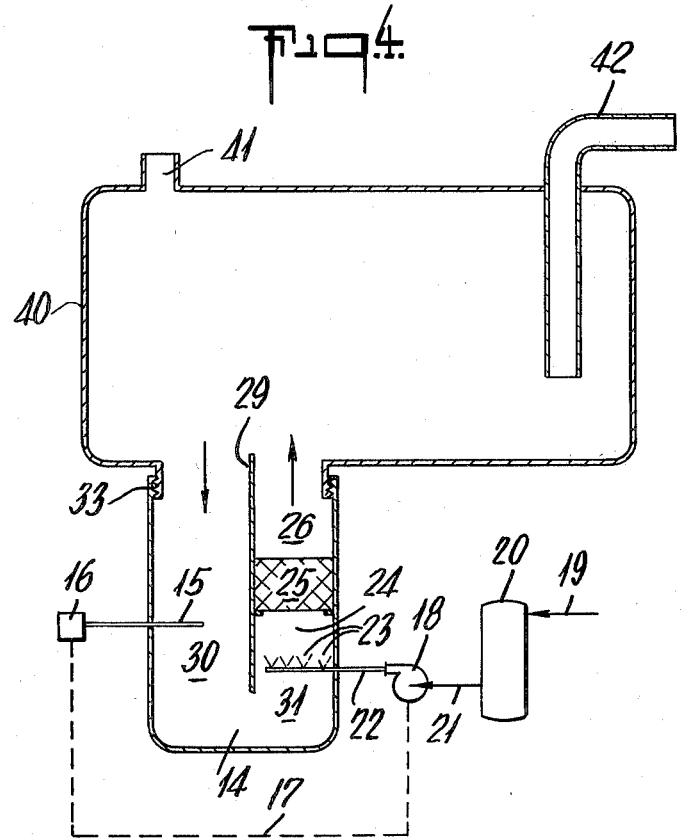

In FIG. 4, the sump is positioned at a low point of the tank 40 to which charge is admitted through line 41 and from which liquid may be withdrawn through line 42. As the water is detected by probe 15, the preferred ketal 2,2-dimethoxy propane is injected into mixing area 24 (as is described in connection with the configuration of FIG. 2). The combined density head and velocity head passes the liquids through bed 25. The mixture in the tank is thus dewatered to desired degree.

Although this invention has been illustrated by reference to specific embodiments, it will be apparent to those skilled in the art that various changes and modifications may be made which clearly fall within the scope of this invention.

I claim:

1. The method for dewatering a flowing stream of non-aqueous liquid containing water therein which comprises determining the content of water in said flowing stream of non-aqueous liquid at a point adjacent to a water-sensing probe in said flowing stream, passing at least a portion of said flowing stream from said point adjacent to said water-sensing probe to the entrance of a body of acid resin catalyst, generating a signal in said water-sensing probe in accordance with the water content detected by said water-sensing probe, adding at least one dewatering chemical selected from the group consisting of ketal, acetal, and orthoester to said portion of said flowing stream in accordance with said signal, at a point between said probe and said entrance to said body of acid resin catalyst, passing said portion of said flowing stream and said added dewatering chemical into contact with said body of acid resin catalyst wherein said dewatering chemical reacts with said water and decreases the water content of said portion, and returning said portion to said flowing stream thereby forming a flowing stream of decreased water content, and recovering said flowing stream of decreased water content.

2. The method for dewatering a flowing stream of non-aqueous liquid as claimed in claim 1 wherein said non-aqueous liquid is a hydrocarbon.

3. The method for dewatering a flowing stream of non-aqueous liquid as claimed in claim 1 wherein said non-aqueous liquid is a fuel oil.

4. The method for dewatering a flowing stream of non-aqueous liquid as claimed in claim 1 wherein said non-aqueous liquid is a diesel oil.

5. The method for dewatering a flowing stream of non-aqueous liquid as claimed in claim 1 wherein said dewatering chemical is a ketal.

6. The method for dewatering a flowing stream of non-aqueous liquid as claimed in claim 1 wherein said dewatering chemical is 2,2-dimethoxy propane.

7. The method for dewatering a flowing stream of non-aqueous liquid as claimed in claim 1 wherein said dewatering chemical is an acetal.

8. The method for dewatering a flowing stream of non-aqueous liquid as claimed in claim 1 wherein said dewatering chemical is an orthoester.

9. The method for dewatering a flowing stream of non-aqueous liquid as claimed in claim 1 wherein said acid resin catalyst is the hydrogen form of divinylbenzene-crosslinked sulfonated polystyrene.

10. The method for dewatering a flowing stream of non-aqueous liquid as claimed in claim 1 wherein dewatering chemical is added in amount in excess of the equivalent amount required to react with said water whereby said flowing stream of decreased water content is protected against the presence of later added water at pH below 7.

* * * * *